June 27, 1961 W. W. CUSHMAN 2,990,070
PNEUMATIC DUNNAGE
Filed Dec. 30, 1958 2 Sheets-Sheet 1

INVENTOR
Walter W. Cushman
BY W. J. Eccleston,
ATTORNEY

June 27, 1961 W. W. CUSHMAN 2,990,070
PNEUMATIC DUNNAGE
Filed Dec. 30, 1958 2 Sheets-Sheet 2
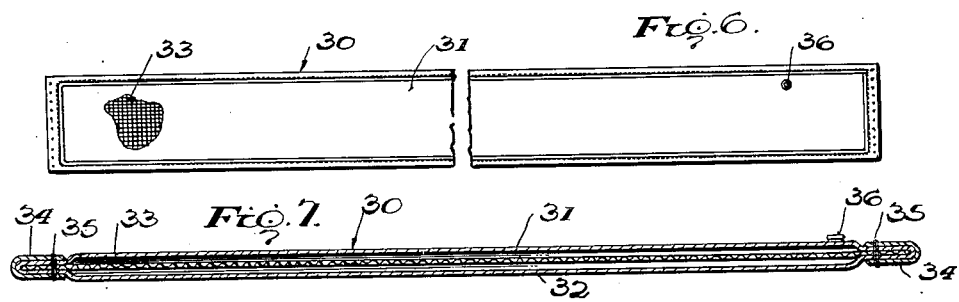
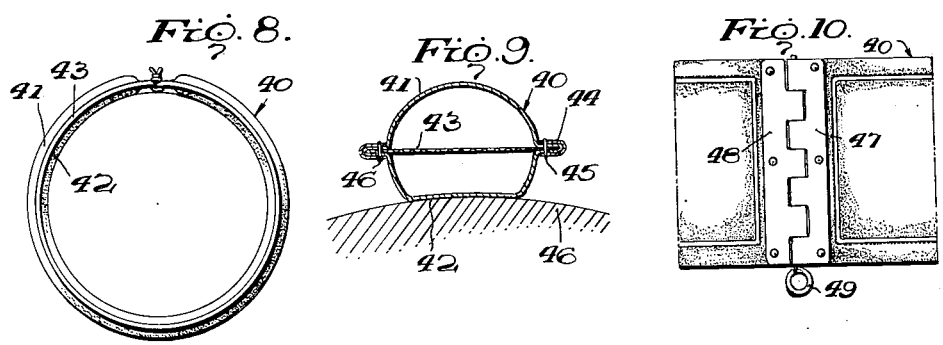
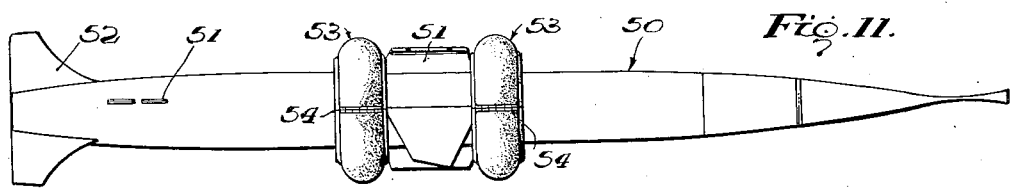
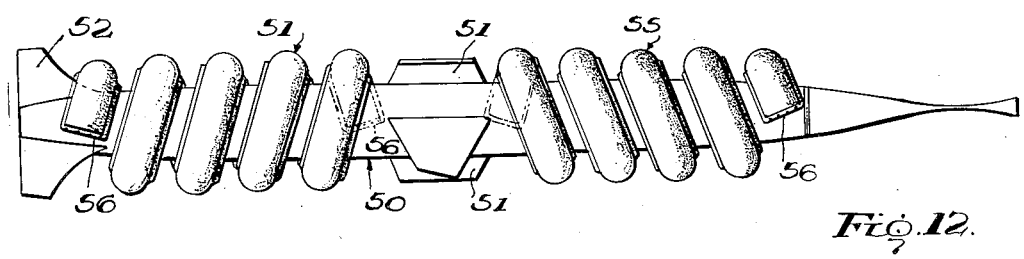
INVENTOR
Walton W. Cushman
BY
W. J. Eccleston
ATTORNEY

United States Patent Office

2,990,070
Patented June 27, 1961

2,990,070
PNEUMATIC DUNNAGE
Walton W. Cushman, 6428 Lumar Drive, SE.,
Webb City, Mo.
Filed Dec. 30, 1958, Ser. No. 784,008
4 Claims. (Cl. 214—10.5)
(Granted under Title 35, U.S. Code (1952), sec. 266)

The invention described herein, if patented, may be manufactured and used by or for the Government for governmental purposes, without the payment to me of any royalty thereon.

The present invention relates to pneumatic dunnage for use in the handling, shipping and storage of materiel of various kinds, sizes and shapes, including missiles, in connection with air, rail, water or truck transportation systems.

Various types of inflatable members or cushions have been employed, such as those used in the packing case of the patent to Reeves No. 1,675,957; the rectangular shoring devices of Scott Patent No. 2,674,206; and the tubular inflatable protective packing means of the patent to Couse No. 2,449,591, to name a few which are representative of the patented prior art pertaining to the general subject of pneumatic dunnage.

The pneumatic dunnage of the present invention provides means for packing and protecting containers carrying delicate instruments or fragile goods during handling and shipment in an irregular compartment such, for example, as the fuselage of an aircraft. It is also particularly useful in protecting the delicate fins of missiles so that they may be shipped, uncrated, in military and other aircraft.

Previous pneumatic dunnage had several disadvantages, one being that of undue distortion in the plane of its major dimensions with insufficient distortion or expansion in its effective direction. In an effort to improve the distortion or expansion relationship of the pillow-like and other shapes, or forms, of inflatable pieces of dunnage, it was customary to form it from relatively thick gauge and thus heavy rubber, rubber composition, or other fabric reinforced elastomeric sheet stock which was vulcanized together at its surrounding edges to produce the desired article. These heavy and bulky articles were not only costly, but did not fully provide the necessary degree of restraining force in the effective expansion direction. Lighter gauge elastomers, or fabric reinforced elastomers, were obviously impracticable because of their inability to withstand the required internal pressures without excessive distortion, or even bursting, in those areas of its surface not used to restrain cargo.

The present invention was, therefore, evolved to overcome the enumerated and other disadvantages of previously known pneumatic dunnage.

One of the important objects of the present invention is to provide articles, members, or units of pneumatic dunnage of various shapes and sizes which are lighter in weight and capable of being collapsed into a package of smaller or more compact size for return shipment, or storage.

Other objects of the invention are to provide articles of pneumatic dunnage which are formed from thin gauge elastomeric composition, or plastic sheets, or pieces, thus producing lightweight articles which possess mono-directional distortion characteristics in use and which are rugged and relatively inexpensive and easy to mass produce by known and readily available processes and apparatus; another object being to incorporate in the article of dunnage, during its manufacture, simple and inexpensive means for preventing, or at least reducing to a minimum, the possibility of undesirable distortion, or bursting, of the article as the result of its being subjected to pressures in various directions and heavy and sudden impacts during its normal use in transit, even though it may be made of relatively low-strength materials.

A further object is to provide new and novel articles, members, or units of inflatable dunnage which are capable of being brought into improved surface contact with various articles or bodies of varying size and irregular shape, form, or contour, to increase the cushioning effect and thus further protect them from damage during handling, airborne and other modes of shipment, and storage.

The foregoing and other objects and advantages of the instant invention will appear from the following description and appended claims when considered in conjunction with the accompanying drawings wherein like reference characters designate corresponding parts in the several views.

In said drawings:

FIG. 6 is a top plan view, partly broken away, of an elongated pneumatic dunnage member, or unit, exemplifying a modification of the present concept;

FIG. 7 is an edge view of the pneumatic dunnage unit of FIG. 6;

FIGS. 8, 9 and 10 are views of a modified form of elongated pneumatic dunnage member, or unit, generally like that of FIGS. 6 and 7, but having releasable connecting means at its opposite ends, FIG. 8 being an end view of a round article about which the unit of dunnage is wrapped and before its inflation, FIG. 9 being a cross section through the inflated dunnage unit and a fragment of the round object which it is embracing; and FIG. 10 being a fragmentary plan view of the pneumatic dunnage unit of FIGS. 8 and 9, showing its releasably connected ends;

FIG. 11 is an elevational view showing the use of two spaced units like that of FIGS. 8, 9 and 10 on a missile to protect its fragile fins; and FIG. 12 is a view similar to FIG. 11 but showing the use of two dunnage members generally like those of FIGS. 8, 9 and 10, but of greater length to provide additional missile coverage.

Figure 1:
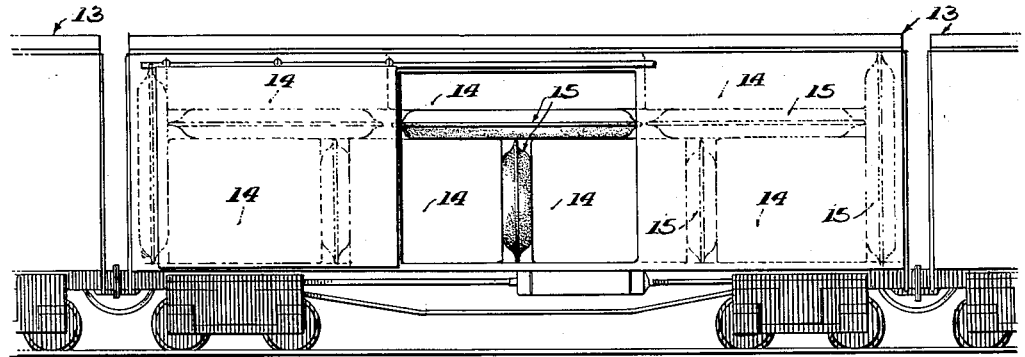
FIG. 1 is an elevational view of a loaded railroad box car showing the use of one form of pneumatic dunnage embodying the present invention.

Referring now to the drawings and particularly to FIGS. 1 through 5 thereof, there is shown one embodiment of the present invention. In FIG. 1 railroad box cars, each indicated at 13, are shown. The center car 13 is loaded with packing boxes or crates of various sizes, each indicated at 14, and these crates or boxes are separated and protected against shifting relative to the car, by the interposed or otherwise placed pieces or members 15 of inflatable dunnage of the type shown more clearly in FIGS. 2 through 5.

Figure 5:
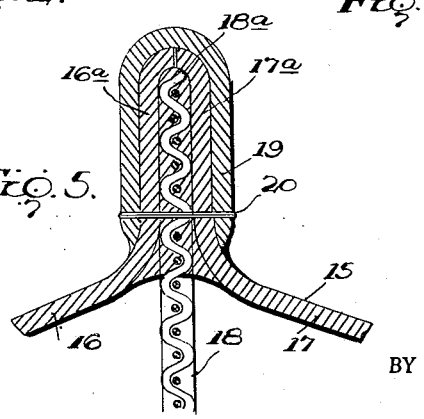
FIG. 5 is an enlarged or blown-up fragmentary vertical sectional view of a marginal portion of an article or unit of pneumatic dunnage of the preceding views.

Each inflatable dunnage member 15, as shown, comprises two outer generally like pieces or sheets 16 and 17 formed from one of the elastomers, or from some suitable plastic. These sheets or pieces 16 and 17 are shown as being rectangular, but it is to be understood that the shape, or outline, as well as the size, of them may vary in accordance with the intended use of the dunnage member. Interposed between the two sheets 16 and 17 is a perforate or foraminous member 18, see particularly FIG. 3, which is of substantially the same size, shape, and has substantially the same area as the outer sheets 16 and 17. The sheet 18 has a very low stretch factor. The three members 16, 17, and 18 are assembled and preferably laid flat, whereupon their surrounding or peripheral edge portions, or margins 16a, 17a and 18a, see FIG. 5, are vulcanized so as to bond the three laminations together and thus provide a relatively stiff, though bendable, unitary margin surrounding the members 16, 17, and 18. If desired, a binding 19, see particularly FIG. 5, may be applied to the marginal or surrounding edge portions 16a and 17a and secured thereto by stitching 20. As clearly shown in FIG. 5, when the parts are assembled into the dunnage unit 15, as explained above, the stitching 20 will extend through the binding 19 and the flanges or marginal portions 16a, 17a, and also through the margin 18a of the perforate or foraminous virtually non-stretchable inner piece or member 18. The stitching 20 is preferably multiple strand nylon stitching, having great strength and durability.

Figures 2, 3, 4:
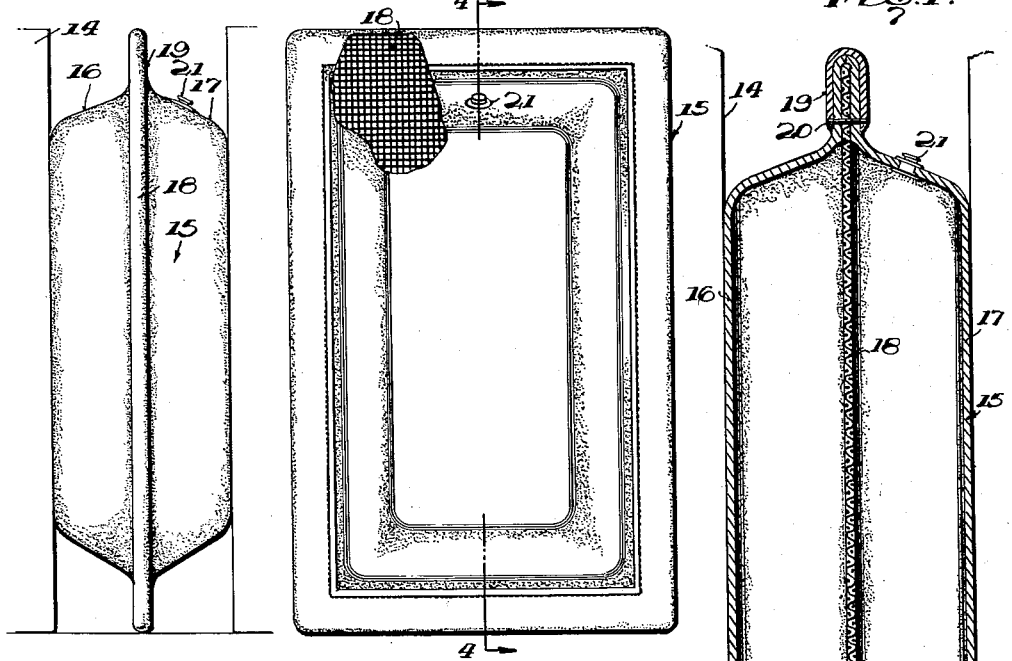
FIG. 2 is an edge view of a single piece of the inflatable dunnage shown in FIG. 1, being located between and maintaining in spaced relation, two shipping boxes or cases as seen fragmentarily.
FIG. 3 is a front elevational view, partly broken away, of the dunnage unit of FIG. 2, showing a portion of the distortion-preventing, or minimizing, means of the invention.
FIG. 4 is a vertical section taken substantially along the line 4—4 of FIG. 3, looking in the direction of the arrows.

As seen in FIGS. 2, 3 and 4, the piece or section of elastic material 17 is provided with a valve assembly 21 which permits the article of dunnage to be rapidly inflated from its flat-wise out-of-use condition to its inflated condition, as shown particularly in FIGS. 2 and 4.

The method or process and/or the equipment or apparatus employed to produce the dunnage member 15 may be conventional in nature, the principal purpose being to bind together, as a unit, the marginal edge portions 16a, 17a and 18a, with or without the binding 19 and the stitching 20.

As mentioned above, the material from which the body members 16 and 17 of the inflated dunnage unit are formed, may be selected from any one of the well-known elastomers. In any event, it is desirable to employ relatively light-weight, preferably thin gauge material which has the quality of elasticity and yet which has the characteristic of returning to its normal shape, condition, and size after the dunnage member has been deflated for storage purposes.

The internal perforate or foraminous member 18, which is bonded, as explained above, to the marginal edges 16a and 17a of the dunnage bag-like or pillow-like structure of FIGS. 1 through 5, may be of ordinary aluminum or copper screen wire; or, if desirable, a sheet, or piece of burlap or other porous fabric may be employed. The purpose of the intermediate piece 18 is to prevent undue stretching and deformation of the dunnage item upon its inflation and use in either of the two non-useful or non-essential directions. Obviously, the elasticity and stretchability of the sheets 16 and 17 permit the dunnage member 15 to assume various shapes and to thus accommodate itself to the contour or shape of the article being shipped or transported. This is an important characteristic of any article of inflatable dunnage in accordance with the present invention, but heretofore, and insofar as is known, all types of inflatable dunnage had the disadvantage of great bulk and heavy weight and thus a less elastic contact surface, because it was, of course, objectionable and undesirable for the article of dunnage to have any permanent distortion or misshaping during inflation and use. Since there was no conception and thus no known means for restricting or minimizing undesirable and non-useful distortion of prior art dunnage articles, relatively heavy gauge materials had to be employed. In accordance with the present invention, light weight and thin gauge elastic material may now be employed because of the novel means for preventing any appreciable non-useful or non-essential distortion, or misshaping of the article of dunnage resulting from its use in shipment.

Referring now to FIGS. 6 and 7 of the drawings, there is shown a somewhat different form of the present invention. The article of dunnage shown in these views is like that of the preceding views. It is to be noted, however, that in this form of the invention, the dunnage article, shown as a whole at 30 is preferably composed of two outer strips, or oblong pieces, 31 and 32 of some suitable elastomer, with an interposed distortion restricting or controlling member 33, which latter is secured between the marginal or surrounding edge portions of the outer pieces 31 and 32, by vulcanization, in the same manner as described in connection with the preceding form of the present invention. A surrounding binding member 34 may be employed and this binding is preferably attached to the laminated peripheral portions of the members 31, 32, and 33 by multiple strand nylon stitching 35. The article 30 is also provided with a valve assembly 36 to permit it to be rapidly inflated and/or deflated. This inflatable dunnage member 30 is adapted to be used to wrap around articles for shipment purposes, or to be stuffed in narrow spaces between adjacent articles to be shipped. The internal member 33 may, as in the preceding form of the invention, be formed from screen wire, or other suitable material, having a low stretch factor and thus the dunnage article 30 is prevented from being ineffectively distorted when inflated.

Another embodiment of the present invention is shown in FIGS. 8, 9, 10. In these views, the dunnage article is indicated as a whole at 40 and comprises inner and outer elongated strips or pieces 41 and 42, preferably formed from some suitable elastomer, or the like. An interposed elongated strip or piece 43 of screen wire, or the like, is secured at its surrounding or marginal edge portions to the adjacent surrounding edge portions of the pieces 41 and 42, the three being preferably vulcanized together, as a unit, and also being provided with a binding 44 which is held to the three thicknesses of marginal edges by multiple strand nylon stitching 45.

The length of the dunnage member 40 of FIGS. 8 through 10 may be varied in accordance with the particular requirements of its use. It is particularly useful for protecting round or cylindrical articles, such as that shown fragmentarily at 46 in FIG. 9. To maintain the member in its article-contacting and protecting position, its ends have attached thereto sections or halves 47 and 48 of a piano-type hinge structure. A pin or pintle 49 is provided for engagement with the aligned interfitting eyes of the hinge members to hold the parts together, see particularly FIG. 10. As in the preceding forms of the invention, the inflatable member 40 is prevented from undue permanent distortion from use, by means of the internal stretch-prohibiting or distortion-restricting member 43 (FIG. 9).

It is a well-known fact that much material for military and other uses is airborne, such material including missiles of varying sizes, shapes, and weights. All missiles are necessarily provided with delicate, fragile, light-weight external fins for guiding them in flight. Obviously, these fins must be carefully protected from damage during handling and shipment for the simple reason that a damaged fin might cause serious misdirection during the flight of a missile.

In FIGS. 11 and 12 of the drawings, a representative missile it shown as a whole at 50, said missile being provided with external peripheral fins 51 and tail fins 52, all of which must be protected during handling and shipment. For this purpose, two further modified forms of the present invention, generally similar, however, to the form shown in FIGS. 6 through 10, are provided.

In the form of FIG. 11, a relatively short inflatable dunnage member, shown as a whole at 53, is provided. Each of these members 53, two such being shown adjacent the external peripheral fins 51, is secured together at its ends by any suitable and conventional connecting means 54. Such means 54 may well take, for example, the form of the piano-type hinge 47 of FIG. 10, although any other means may be substituted. It will be understood, of course, that any number of the tubular complete dunnage members 53 may be employed in order to protect the missile 50 throughout its length. The normal diameter of the member 53 may, of course, be varied and the inflation pressure may also vary. It will also be understood that each member 53 is of laminated structure containing two like outer sheets or pieces of material and an intermediate piece of strip of screen wire, or the like to reduce to a minimum the possibility of any permanent distortion of the dunnage member 53 from use.

A variation in the use and size of the dunnage member 53 of FIG. 11 is illustrated in FIG. 12 wherein two elongated tube-like dunnage members 55 are wrapped around the missile 50. One of the members 55 extends from the tail fins 52 to the peripheral fins 51, the other member 55 extending from the forward end of the peripheral fins 51 toward the nose of the projectile or missile. Member 55 is of laminated structure and comprises a pair of like outer members and an intermediate member which serves to restrict distortion of a permanent nature to the dunnage member 55 due to its use. As seen in FIG. 12, suitable fastening means 56 may be provided at the ends of each member 55 simply to provide means for maintaining it in its wrap-around condition, as shown.

Before applying the member 55 to the missile 50, it is partially inflated. After it has been wrapped around the missile, member 55 is further inflated so as to provide a cushion affording the necessary degree of protection of missile 50 during handling and shipment.

Obviously, the invention is not limited to the embodiments herein shown and described, but may assume other forms.

What I claim is:

1. An inflatable dunnage member for protecting articles and containers having articles therein, said member including a body portion and a surrounding outwardly projecting marginal portion, and comprising two substantially like pieces of elastic material, an interposed piece of meshed wire fabric of substantially the same size as the two pieces of elastic material, said interposed piece being unattached except at its outwardly projecting marginal portion to the outwardly projecting marginal portions of the two substantially like pieces of elastic material, all three of said pieces being in contact and bonded together solely at their projecting marginal edge portions all of which portions extend generally in parallel planes, valve means carried by one of the elastic pieces whereby the dunnage member may be inflated or deflated, and a binding covering the projecting generally parallel marginal edge portions of the three pieces of material and held thereto to seal said edge portions, said binding being stitched thereto with the stitches extending through all three pieces, said interposed piece of meshed wire fabric resisting stretching of the body and marginal portions of the dunnage member in the planes of the length and width of said member.

2. A collapsible dunnage member for protecting articles or containers having articles therein, an elongated body portion and a surrounding outwardly extending marginal portion comprising two like narrow and elongated strips of air, gas and liquid impervious elastic material, a third strip of substantially the same length and width as the two like strips and interposed between said strips to provide an inflatable tube-like structure, said two like strips and said third strip presenting outwardly extending marginal edge portions bonded together as a unit, said third strip being foraminous and substantially inelastic whereby to prevent permanent distortion of said dunnage member upon inflation and use, a binding strip entirely covering the outwardly extending bonded-together edge portions and being stitched thereto and therethrough to permanently seal the dunnage member, a piano-type hinge means having mating cooperable parts carried by said outwardly extending marginal edge portions at the opposite ends of said elongated body to facilitate the mounting of said dunnage member on an article to be shipped, and means for permitting the inflation and deflation of said member.

3. An inflatable dunnage member for protecting articles or containers having articles therein, said member including a body portion and a surrounding outwardly projecting marginal portion comprising two substantially like pieces of elastic material, an interposed piece of meshed wire fabric of substantially the same size as the two pieces of plastic material unattached except around its outwardly projecting marginal portion to the two substantially like pieces, all of said pieces being in contact and bonded together solely at their projecting marginal edge portions, said bonded-together edge portions extending uninterruptedly around said body portion, valve means carried by one of said elastic pieces whereby the dunnage member may be inflated, and a binding covering the projecting marignal edge portions of three pieces of material and held thereto to seal said edges, said binding being stitched thereto with the stitches extending through the two thicknesses of elastic material and also the interposed piece of inelastic meshed wire fabric material, said interposed piece of meshed wire fabric providing means for maintaining the dunnage member in substantially its original contoured outline when inflated.

4. A collapsible dunnage member for protecting articles or containers having articles therein, an elongated body portion and a surrounding outwardly extending marginal portion comprising two like narrow and elongated strips of air, gas, and liquid impervious elastic material, a third strip formed from meshed wire fabric of substantially the same length and width as the two like strips and interposed between said strips to provide an inflatable tube-like structure, said two like strips and said third strip presenting outwardly extending marginal edge portions bonded together as a unit, said third strip being substantially inelastic whereby to prevent permanent distortion of said dunnage member upon inflation and use, a binding strip entirely covering the outwardly extending bonded-together edge portions and being stitched thereto and therethrough to permanently seal the dunnage member, and means facilitating the inflation and deflation of said member.

References Cited in the file of this patent

UNITED STATES PATENTS

| | | |
|---|---|---|
| 712,720 | Richardson | Nov. 4, 1902 |
| 868,668 | Kepler | Oct. 22, 1907 |
| 1,675,957 | Reeves | July 3, 1928 |
| 1,730,752 | Withers | Oct. 8, 1929 |
| 2,449,591 | Couse | Sept. 21, 1948 |
| 2,674,206 | Scott | Apr. 6, 1954 |
| 2,756,048 | Pfeiffer et al. | July 24, 1956 |
| 2,856,867 | Dasey | Oct. 21, 1958 |

FOREIGN PATENTS

| | | |
|---|---|---|
| 740,699 | Germany | Oct. 27, 1943 |
| 942,165 | Germany | Apr. 26, 1956 |